United States Patent
Ramaprasad et al.

(10) Patent No.: US 11,336,100 B2
(45) Date of Patent: May 17, 2022

(54) SYSTEM AND METHOD FOR BALANCING STATE OF CHARGE OF BATTERY

(71) Applicant: Grey Orange Pte. Ltd., Singapore (SG)

(72) Inventors: Sriram Ramaprasad, Chennai (IN); Nakul Mehan, Kanpur (IN); Venkadesh M., Virudhunagar (IN)

(73) Assignee: GREY ORANGE PTE, LTD., Singapore (SG)

( * ) Notice: Subject to any disclaimer, the term of this patent is extended or adjusted under 35 U.S.C. 154(b) by 241 days.

(21) Appl. No.: 16/763,119

(22) PCT Filed: Aug. 10, 2018

(86) PCT No.: PCT/IB2018/056037
§ 371 (c)(1),
(2) Date: May 11, 2020

(87) PCT Pub. No.: WO2019/030717
PCT Pub. Date: Feb. 14, 2019

(65) Prior Publication Data
US 2021/0376616 A1 Dec. 2, 2021

(30) Foreign Application Priority Data
Aug. 10, 2017 (GB) ..................................... 1712858

(51) Int. Cl.
H02J 7/00 (2006.01)
(52) U.S. Cl.
CPC .......... H02J 7/0014 (2013.01); H02J 7/0048 (2020.01)
(58) Field of Classification Search
CPC ...... H02J 7/0014; H02J 7/0048; H02J 7/0031; H02J 7/0016; H02J 7/0018; H02J 7/0019; H01M 2010/4271; B60L 58/22
(Continued)

(56) References Cited

U.S. PATENT DOCUMENTS

2009/0278488 A1 11/2009 Choi et al.
2010/0148726 A1 6/2010 Lee et al.
(Continued)

FOREIGN PATENT DOCUMENTS

EP 2565959 A2 3/2013
EP 2583858 A1 4/2013
(Continued)

OTHER PUBLICATIONS

Notification of Transmittal of The International Search Report and The Written Opinion of The International Searching Authority, or the Declaration issued in International Application No. PCT/IB2018/056037 dated Dec. 5, 2018, 18 pages.
(Continued)

Primary Examiner — Richard Isla
Assistant Examiner — Mohammed J Sharief
(74) Attorney, Agent, or Firm — Ziegler IP Law Group, LLC (57) ABSTRACT

A system and method for balancing a battery having a plurality of cells connected in series. The system includes a plurality of reactive charge transfer units connected with the plurality of cells, a first control unit and a second control unit. The first control unit is configured to determine a state of charge of the plurality of cells, determine a reference value associated with the battery, identify an overcharged cell or a discharged cell in the battery, and determine a charge differential between state of charge of the overcharged cell or the discharged cell and the reference value associated with the battery. The second control unit is configured to arrange charge transfer between the overcharged cell or the discharged cell, and remaining pack of cells in the battery. The first and the second control units are configured to function iteratively until cell balancing is attained.

13 Claims, 6 Drawing Sheets

(58) Field of Classification Search
USPC .................................. 320/132, 134, 136
See application file for complete search history.

(56) References Cited

U.S. PATENT DOCUMENTS

| | | |
|---|---|---|
| 2011/0140663 A1 | 6/2011 | Tofigh et al. |
| 2013/0127399 A1 | 5/2013 | Tang et al. |
| 2013/0221926 A1* | 8/2013 | Furtner ................ H02J 7/0018 320/129 |

FOREIGN PATENT DOCUMENTS

| | | | |
|---|---|---|---|
| GB | 2451138 A | 1/2009 | |
| GB | 2536657 A | 9/2016 | |
| WO | WO-2007145464 A1 * | 12/2007 | ............ H02J 7/0016 |

OTHER PUBLICATIONS

Combined Search and Examination Report under Sections 17 and 18(3) issued in Patent Application No. GB1712858.8 dated Feb. 7, 2018, 7 pages.
Examination Report under Sections 18(3) issued in Patent Application No. GB1712858.8 dated Jul. 22, 2019, 4 pages.
International Preliminary Report on Patentability issued in International Application No. PCT/IB2018/056037 dated Feb. 11, 2020, 12 pages.
Intention to Grant under Section 18(4) issued in Patent Application No. GB1712858.8 dated Feb. 13, 2020, 2 pages.

* cited by examiner

SYSTEM AND METHOD FOR BALANCING STATE OF CHARGE OF BATTERY

TECHNICAL FIELD

The present disclosure relates generally to batteries; and more specifically, to methods and systems for balancing of state of charge of cells within the batteries. Furthermore, the methods and systems employed in the present disclosure employ active balancing to achieve a balanced state of charge in the batteries.

BACKGROUND

Typically, batteries have been widely used in a variety of electronic devices to provide electrical power. With advancements in technologies, batteries can provide charge density and electrical power in unprecedented ranges. Conventionally, batteries comprise an arrangement of a number of cells. Generally, cells in batteries are connected in series to form a battery. Moreover, such cells store energy which can be utilized later for multiple applications. Furthermore, batteries need to be charged at regular intervals of time to draw electrical power therefrom.

Generally, within batteries, cells may develop physically different characteristics due to aging, uneven temperature distributions and production tolerances. Such imbalances may damage a cell or the battery permanently due to prolonged overcharging and discharging. Furthermore, in an event of a charge imbalance in the battery, discharging of the battery may stop when a cell with lowest state of charge reaches a minimum charge value. Therefore, operation of the battery may be inefficient as charge imbalance limits ability of the battery to supply electrical power. Subsequently, cells in the battery may remain uncharged as the charging of the battery may stop when a cell with the highest state of charge reaches a maximum value.

Conventionally, cell balancing or cell equalizations methods have been developed to protect the batteries from permanent damage and increase their efficiency. However, conventional cell balancing methods employ passive balancing system. Specifically, passive balancing system involves dissipation of energy to equalize state of charge of the cells. Alternatively, active cell balancing system may be employed to attain cell balancing. However, in conventional active cell balancing systems, balancing is done on a per cell basis. Consequently, the process may be tedious if circuitry involved in the battery is complex or the battery comprises of large number of cells. Additionally, balancing a battery on a per cell basis may damage the cells if imbalance therebetween is of larger magnitude.

Therefore, in light of the foregoing discussion, there exists a need to overcome the aforementioned drawbacks associated with conventional methods of cell balancing.

SUMMARY

The present disclosure seeks to provide a system for balancing a battery having cells connected in series. The present disclosure also seeks to provide a method for balancing such battery. The present disclosure seeks to provide a solution to the existing problem of battery damage due to charge imbalance in the cells. An aim of the present disclosure is to provide a solution that overcomes at least partially the problems encountered in prior art, and provides an efficient and reliable cell balancing system.

In one aspect, an embodiment of the present disclosure provides a system for balancing a battery having a plurality of cells connected in series, characterized in that the system comprising:
(a) a plurality of reactive charge transfer units connected with the plurality of cells;
(b) a first control unit configured to:
  (i) determine a state of charge of each of the plurality of cells;
  (ii) determine a reference value associated with the battery;
  (iii) identify an overcharged cell or a discharged cell in the battery, using the state of charge of each of the plurality of cells, or the reference value associated with the battery; and
  (iv) determine a charge differential between state of charge of the overcharged cell or the discharged cell and the reference value associated with the battery; and
(c) a second control unit configured to arrange charge transfer between the overcharged cell or the discharged cell, and remaining pack of cells in the battery via the plurality of reactive charge transfer units;
wherein the first and the second control units are configured to function iteratively until cell balancing is attained, and wherein the second control unit is configured to arrange charge transfer by:
  (i) dividing the charge differential of the overcharged cell or the discharged cell based on number of cells in the remaining pack of cells; and
  (ii) arranging parallel transfer of divided charge differential between the overcharged cell or the discharged cell and each of the cells in remaining pack of cells in the battery via the plurality of reactive charge transfer units.

In another aspect, an embodiment of the present disclosure provides a method for balancing a battery having a plurality of cells connected in series, characterized in that the method comprising:
(a) determining a state of charge of each of the plurality of cells;
(b) determining a reference value associated with the battery;
(c) identifying an overcharged cell or a discharged cell in the battery, using the state of charge of each of the plurality of cells, or the reference value associated with the battery;
(d) determining a charge differential between state of charge of the overcharged cell or the discharged cell and the reference value associated with the battery;
(e) arranging charge transfer between the overcharged cell or the discharged cell, and remaining pack of cells in the battery; and
(f) iteratively performing steps (a) to (e) until cell balancing is attained, overcharged cell or the discharged cell and remaining pack of cells in the battery comprises:
  (i) dividing the charge differential of the overcharged cell or the discharged cell based on number of cells in the remaining pack of cells, and
  (ii) arranging parallel transfer of divided charge differential between the overcharged cell or the discharged cell and each of the cells in remaining pack the battery.

Embodiments of the present disclosure substantially eliminate or at least partially address the aforementioned problems in the prior art, and enables active balancing of charge of cells in a battery.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for balancing a battery having a plurality of cells connected in series, characterized in that the system comprising:
(a) a plurality of reactive charge transfer units connected with the plurality of cells;
(b) a first control unit configured to:
  (i) determine a state of charge of each of the plurality of cells;
  (ii) determine a reference value associated with the battery;
  (iii) identify an overcharged cell or a discharged cell in the battery, using the state of charge of each of the plurality of cells, or the reference value associated with the battery; and
  (iv) determine a charge differential between state of charge of the overcharged cell or the discharged cell and the reference value associated with the battery; and
(c) a second control unit configured to arrange charge transfer between the overcharged cell or the discharged cell, and remaining pack of cells in the battery via the plurality of reactive charge transfer units;
wherein the first and the second control units are configured to function iteratively until cell balancing is attained, and wherein the second control unit is configured to arrange charge transfer by:
  (i) dividing the charge differential of the overcharged cell or the discharged cell based on number of cells in the remaining pack of cells; and
  (ii) arranging parallel transfer of divided charge differential between the overcharged cell or the discharged cell and each of the cells in remaining pack of cells in the battery via the plurality of reactive charge transfer units.

In another aspect, an embodiment of the present disclosure provides a method for balancing a battery having a plurality of cells connected in series, characterized in that the method comprising:
(a) determining a state of charge of each of the plurality of cells;
(b) determining a reference value associated with the battery;
(c) identifying an overcharged cell or a discharged cell in the battery, using the state of charge of each of the plurality of cells, or the reference value associated with the battery;
(d) determining a charge differential between state of charge of the overcharged cell or the discharged cell and the reference value associated with the battery;
(e) arranging charge transfer between the overcharged cell or the discharged cell, and remaining pack of cells in the battery; and
(f) iteratively performing steps (a) to (e) until cell balancing is attained, wherein arranging charge transfer between the cell or the discharged cell and remaining pack of cells in the battery comprises:
  (i) dividing the charge differential of the overcharged cell or the discharged cell based on number of cells in the remaining pack of cells, and
  (ii) arranging parallel transfer of divided charge differential between the overcharged cell or the discharged cell and each of the cells in remaining pack the battery.

The present disclosure provides a system and method for balancing a battery having a plurality of battery packs connected in series, wherein each battery pack comprises of a plurality of cells connected in series. The system described herein provides an efficient and reliable arrangement for cell balancing. Furthermore, the system employs active balancing for the cells in the battery. Consequently, dissipation of energy to equalize state of charge of the cells is negligible. Additionally, circuitry involved in the battery is fairly straightforward and easy to implement. Moreover, imbalances of larger magnitudes between cells are managed efficiently. Beneficially, the cell balancing is implemented in parallel, thereby reducing balancing time substantially.

Throughout the present disclosure, the term "battery" used herein relates to a device having a plurality of cells connected in series provided with external connections.

Specifically, the external connections are provided to supply electrical power to external devices. Optionally, cell balancing in the battery may be employed in an instance of a substantial charge differential between the plurality of cells in the battery.

In an embodiment, the term "cells" used herein relates to devices capable of providing electrical energy. Optionally, the electrical energy may be generated therein using chemical reactions or by facilitating chemical reactions through the introduction of electrical energy. Furthermore, the cell may comprise a single cell, or a group of cells connected in series. Example of the cell include, but are not limited to, electrochemical cell, galvanic cell, primary cell, secondary cell, fuel cell, reserve cell, Lithium-ion cells.

In an embodiment, the term "battery pack" used herein relates to group of cells connected in series capable of providing electrical energy. Furthermore, a plurality of battery packs are connected in series to form a battery.

In an embodiment, the plurality of reactive charge transfer units are employed to transfer charge between cells of the battery. Furthermore, the plurality of reactive charge transfer units, connected with the plurality of cells, comprise a reactance element such as inductance and/or a capacitance. Optionally, the plurality of reactive charge transfer units may comprise elements to facilitate, control and arrange charge transfer between the plurality of cells in the battery.

The system for balancing a battery comprises a first control unit. Optionally, the first control unit may be hardware, software, firmware and/or any combination thereof. Additionally, or alternatively, optionally, the first control unit may be a controller on an integrated circuit comprising a processor core, memory, and programmable input/output peripherals. Furthermore, the first control unit may communicate with the plurality of cell and plurality of reactive charge transfer units. Optionally, the input/output peripherals may be employed for such communication.

In the present disclosure, the first control unit is configured to determine a state of charge of each of the plurality of cells. Specifically, the state of charge of each of the plurality of cells provides an accurate estimation of amount of charge in the battery. More specifically, the accurate estimation of the amount of charge in the battery is fundamental to attain cell balancing in the battery.

In an embodiment, methods employed by the first control unit to determine state of charge of each of the plurality of cells may include at least one of: coulomb counting, voltage measurement, impedance spectroscopy, ampere-hours measurement. In one implementation, method employed to determine state of charge of each of the plurality of cells may be coulomb counting. Specifically, in such implementation, the current flowing in and out of a cell per unit time may be measured. Subsequently, a measurement of one coulomb per second may be indicative of 1 Ampere current in the cell. In another implementation, method employed to determine state of charge of each of the plurality of cells may be voltage measurement. In such an implementation, voltage across a cell in the plurality of cells is measured. Subsequently in such implementation, the voltage across the cell is related to the state of charge of the cell using a known discharge curve of the cell. Specifically, the discharge curve of the cell depicts a variation of voltage in across terminals of the cell with change in state of charge.

The first control unit is configured to determine a reference value associated with the battery from the determined state of charge of each of the plurality of cells. In an embodiment, the reference value associated with the battery is a mean state of charge of the battery. Specifically, the first control unit may determine the mean state of charge of the battery by calculation using the determined state of charge of each of the plurality of cells and total number of cells in the battery. More specifically, the determined state of charge of each of the plurality of cells may be added. Subsequently, the added state of charge of each of the plurality of cells may be divided by the total number of cells in the battery to determine the mean state of charge of the battery. In an alternate embodiment, the reference value associated with the battery comprises a threshold value, in addition with the mean state of charge of the battery. Specifically, the threshold value may be a minimum state of charge, required to maintain functionality of each of the plurality of cells in the battery.

Furthermore, the first control unit is configured to identify a plurality of overcharged cells or discharged cells in the battery using the state of charge of each of the plurality of cells, or the reference value associated with the battery. In an embodiment, the term "overcharged cell" used herein relates to a cell, or a group of cells connected in series, having a state of charge substantially higher than the plurality of cells in the battery. In an embodiment, the term "discharged cell" used herein relates to a cell, or a group of cells connected in series, having a state of charge substantially lower than the plurality of cells in the battery.

In an embodiment, identifying the plurality of overcharged cells or the discharged cells in the battery comprises comparing the state of charge of each cell with state of charge of each of the plurality of cells. Specifically, the states of charge of the plurality of cells are compared with each other to identify an overcharged or discharged cell in the battery. More specifically, a cell in the plurality of cells having the state of charge substantially different in comparison with remaining pack of cells in the battery may be identified as the overcharged cell or discharged cell.

In another embodiment, identifying the plurality of overcharged cells or discharged cells in the battery comprises comparing the state of charge of each cell with the reference value associated with the battery. Specifically, the determined reference value associated with the battery may be used as a standard for state of charge of the battery. More specifically, a cell in the plurality of cells having the state of charge substantially different in comparison with the reference value associated with battery may be identified as the overcharged cell or discharged cell.

In an embodiment, the overcharged cell in the battery is a cell having a maximum state of charge and the discharged cell in the battery is a cell having a minimum state of charge. In an instance, the cell having a maximum or minimum state of charge may be identified by comparison with state of charge of each of the plurality of cells in the battery. In another instance, the cell having a maximum or minimum state of charge may be identified with respect to the reference value associated with the battery.

The first control unit is further configured to determine a charge differential between state of charge of the plurality of overcharged cells or the discharged cells and the reference value associated with the battery. Specifically, the charge differential is the difference in the state of charge of the overcharged cell or discharged cell and the reference value associated with the battery. Moreover, the charge differential may provide an estimation of the charge transfer required between the overcharged cell or the discharged cell, and the remaining pack of cells in the battery.

The system for balancing a battery comprises a second control unit. Optionally, the first control unit may be hardware, software, firmware and/or any combination thereof.

Additionally, or alternatively, optionally, the first control unit may be a controller on an integrated circuit comprising a processor core, memory, and programmable input/output peripherals. Furthermore, the first control unit may communicate with the plurality of cell and plurality of reactive charge transfer units. Optionally, the input/output peripherals may be employed for such communication.

The second control unit is configured to arrange charge transfer between the overcharged cell or the discharged cell, and remaining plurality of cells in the battery via the plurality of reactive charge transfer units. Optionally, the second control unit may arrange connections in the plurality of reactive charge transfer units to arrange charge transfer.

In an embodiment, the second control unit is configured to arrange charge transfer by dividing the charge differential of the overcharged cell or the discharged cell based on number of cells in the remaining pack of cells. Furthermore, optionally, the second control unit is configured to arrange charge transfer by arranging transfer of divided charge differential between the overcharged cell or the discharged cell and each of the cells in the remaining pack of cells in the battery via the plurality of reactive charge transfer units. Optionally, the second control unit may divide the charge differential evenly between the remaining pack of cells to be exchanged with the overcharged or discharged cell. Additionally, or alternatively, optionally, the second control unit may divide the charge differential between the cells based on the state of charge of each of the remaining pack of cells. In an instance, the charge may be transferred between an overcharged cell and the remaining pack of cells. In such instance, the remaining pack of cells may comprise cells with varied states of charge. Therefore, in such instance, charge differential between the overcharged cell and the remaining pack of cells may be divided such that cells with a lower state of charge are provided with higher charge transfer.

In an embodiment, the first control unit is operable to control the second control unit. Specifically, the first control unit may provide communication signals to the second control unit to control operation thereof. More specifically, the second control unit may arrange charge transfer based on the communication signals received from the first control unit. Furthermore, the first control unit may provide communication signals for operation of the second control unit based on the state of charge of the plurality of cells, reference value associated with the battery and the charge differential.

In an embodiment, each of plurality of reactive charge transfer units comprises a transformer. Specifically, a transformer comprised in the reactive charge transfer unit employs inductances as reactance elements. Furthermore, a respective transformer is associated with a respective cell. Specifically, a respective transformer may arrange charge transfer between the cell associated therewith and the remaining pack of cells in the battery. Additionally, the transformer may arrange charge transfer between the plurality of cell using electromagnetic induction.

According to an embodiment, each of the plurality of transformer comprises a first and second side. Specifically, the first and second side may refer to windings of a transformer. Optionally, the transformer comprises a one-to-one ratio of windings in the first and second side thereof. More optionally, the first sides of each of the respective transformer are connected with the respective cells and second sides of plurality of transformers are connected with the plurality of cells in the battery. Specifically, first side of a respective transformer is connected with the respective cell that is associated with the transformer. Additionally, secondary sides of the plurality of transformers are connected with the plurality of cells in the battery. Consequently, the secondary sides of the plurality of transformers are connected with each other in series. Furthermore, charge transfer may be arranged between the first and the second sides of transformer.

In an embodiment, each of the plurality of reactive charge transfer units further comprise a pair of first and second switching elements operable to control charge transfer between the overcharged or discharged cell and remaining pack of cells in the battery. Specifically, the pair of first and second switching elements may control circuit architecture utilised to attain cell balancing. Furthermore, the second control unit may be operable to control the pair of first and second switching elements. Additionally, the pair of first and second switching elements is configured to function as switches. Furthermore, the pair of first and second switching elements may control the transformers that may be employed in the circuit architecture, and thereby control the charge transfer. Moreover, the pair of first and second switching elements may be turned on and off by providing communication signals thereto. Additionally, the communication signals may be in form of plurality of waveforms.

In an embodiment, the pair of first and second switching elements is associated with first and second side of the transformer, respectively. Specifically, the pair of first and second switching elements may be turned on, or off which controls the side of transformer employed in the circuit architecture. Examples of the pair of first and second switching elements include, but are not limited to, transistors, metal-oxide-semiconductor field-effect transistor (MOSFET), junction gate field-effect transistor (JFET), bipolar junction transistor (BJT).

In an exemplary implementation of the present disclosure, the system may comprise a battery having a plurality of cells. In such implementation, each of the plurality of cells may be a group of six cells. Furthermore, each of the plurality of cells may be provided with a first and second control unit. Specifically, the first and second control unit provided with the battery may be configured to function iteratively until cell balancing is attained between the plurality of cells. Subsequently, after cell balancing has been attained between the plurality of cells, each of the first and second control unit provided with each of the plurality of cells may be configured to function iteratively to attain cell balancing between the group of six cells.

In an example, let us assume that the battery comprises four battery packs connected in series, wherein each battery pack comprises of six cells connected in series. In order to balance the said battery, the system implements a two-stage balancing process, wherein the first stage balances all the four battery packs and the second stage balances the plurality of cells within the four battery packs. In the first stage, the first control unit determines the state of charge of each of the plurality of the cells and the reference value associated with the battery. Subsequently, using the state of charge of the plurality of cells, the first control unit calculate the state of charge (SOC) of battery packs by simply adding the individual SOC of each cell within the battery packs. Now, the first control unit identifies the overcharged or discharged battery pack by comparing the SOC of each battery pack with the reference value of the battery, wherein the reference value relates to the mean SOC of the battery calculated by adding the individual SOC of all the battery packs (SOC of battery pack 1+SOC of battery pack 2+SOC of battery pack 3+SOC of battery pack 4) and dividing the sum by the number of battery packs (i.e. four). Consecutively, the overcharged or discharged battery packs are identified and the first control unit commands the second control unit to arrange the bi-directional charge transfer between the battery packs. The amount of charge to be transferred depends on the difference between the individual SOC of the battery pack and the mean SOC of the battery. Furthermore, the balancing is done in a sequential manner between the plurality of battery pack and eliminating the balanced battery pack from the subsequent iterative function of the first and the second control units in first stage. Moreover, the sequence followed to balance the plurality of battery packs starts from the battery pack connected to the negative terminal of the battery and subsequently moves one by one towards the battery pack connected to the positive terminal of the battery. Furthermore, each balanced battery pack is subsequently eliminated from the further battery balancing process to prevent further imbalance of the battery pack which is already balanced. The said process of balancing the battery packs in first stage is repeated until all the battery packs are balanced. In the second stage the plurality of cells is balanced with the plurality of remaining cells within the same battery pack. Furthermore, the charge transfer from the plurality of cells are achieved using the plurality of reactive charge transfer units, wherein the plurality of reactive charge transfer units are connected in such a manner that the charge is transferred parallelly in between the plurality of cells within the battery pack. It is to be appreciated that the process of balancing the plurality of cells within the battery packs, can be implemented in all the battery packs simultaneously. The said process of second stage is repeated until all the cells are balanced within battery pack and finally the whole battery is balanced.

In an example, charge transfer is arranged between an overcharged cell and the remaining pack of cells in the battery. In such example, first switching element of the first side of transformer associated with the overcharged cell is turned on. Subsequently, the first switching element may be turned on till current in the first side of the transformer reaches a peak value. Consequently, the first switching element may be turned off and the second switching element of the second side of transformer associated with the overcharged cell is turned on synchronously. As discussed above, the second sides of the plurality of transformers are connected in series and with the plurality of transformers. Therefore, when the second switching element of the second side of transformer is turned on, charge is transferred to the remaining pack of cells in the battery.

In another example, charge transfer is arranged between a discharged cell and the remaining pack of cells in the battery. In such example, second switching element of the second side of transformer associated with the discharged cell is turned on. Subsequently, the second switching element may be turned on till current in the second side of the transformer reaches a peak value. Consequently, the second switching element may be turned off and the first switching element of the first side of transformer associated with the discharged cell is turned on synchronously. As discussed above, the first side of a transformer is connected with a respective cell. Therefore, when the first side of the transformer is turned on, charge is transferred to the discharged cell in the battery.

In another exemplary implementation, the system may comprise a battery having a plurality of cells. In such implementation, each of the plurality of cells may comprise a group of varied number of cells. For example, one of the plurality of cells may comprise a group of five cells. In the example, another one of the plurality of cells may comprise a group of three cells. Therefore, the first control unit may function to determine the reference value associated with the battery. In such implementation, the state of charge of the each of the plurality of cells may not be evenly distributed. Consequently, the first and second control unit may function iteratively to attain cells balancing between the each of the varied number of cells in a group. Specifically, the charge differential may be divided and arranged between each of the varied number of cells in a group accordingly to attain cell balancing therebetween.

In an embodiment, after the plurality of battery packs or group of cells are balanced, the plurality of imbalanced cells within a battery pack are balanced. Furthermore, the plurality of cells having different state of charge within the said battery pack are balanced among themselves within the said battery pack to conserve the charge within the said battery pack. Moreover, the cell balancing within the battery pack can be implemented simultaneously among the plurality of battery packs within the battery. Such an implementation reduces the charge balancing time of the battery.

In another embodiment, the second control unit is configured to arrange transfer of charge among the plurality of battery packs in a first stage and among the plurality of cells in a second stage, in a parallel manner respectively. Specifically, the plurality of battery packs are balanced simultaneously in the first stage by transfer of charge among the plurality of battery packs. More specifically, the plurality of cells are balanced simultaneously in the second stage by transfer of charge among the plurality of cells simultaneously.

In an embodiment, a peak value of current in the transformer may be selected based on time required for balancing the battery. Specifically, the peak value of current is the maximum amount of current that may be stored in a side (or, a winding) of a transformer. Additionally, the amount of current stored in the side (or, a winding) of the transformer is inversely proportional to the time required for balancing the battery. In an example, if the peak value of current in the transformer is higher, it may require fewer iterations to attain cell balancing. Therefore, the peak value of current in the transformer may be selected based on the time required for balancing the battery. In an example, a peak value of current in the transformer may be 4 Amperes. In such example, iterations required to attain cell balancing may be high. Therefore, the peak value of current may be increased, to for example 10 Amperes, to reduce the iterations, thereby reducing time to attain cell balancing.

In an embodiment, the second control unit may be configured to implement a balancing algorithm to arrange charge transfer between the plurality of cells in the battery. Specifically, the balancing algorithm may be based on the state of charge of each of the plurality of cells. Alternatively, or additionally, optionally, the balancing algorithm may be based on the reference value associated with the battery. Furthermore, the balancing algorithm controls the pair of switching elements and the charge transfer in the battery.

By way of example, the following describes how to achieve battery balancing by using State of Charge in two stages. The first stage ensures that each cell pack has enough charge to balance itself towards the battery mean and second stage ensures that the battery pack, as a whole is balanced.

Stage 1: Pack Balancing

This ensures that, post this stage, all the packs constituting the Battery will have same mean value of State Of Charge (SOC), though, each pack individually might not be balanced.

Step 1: SOC Information Calculation for Pack 'i'
Assume there are 'n' number of packs starting from 1, till 'n'.
$N_T$ denotes total number of cells in Battery,
$N_{Pi}$ denotes the number of cells in pack 'i'.
SOC Mean Calculation for Pack 'i'
Calculate '$\mu_{pi}$' which is mean SOC of pack 'i'.
Calculate '$\mu_B$' which is mean SOC of Battery.
SOC Deviation Calculation for Pack 'i'
Calculate $$\Delta SOC_{Pi} = \mu_{pi} - \mu_B$$

where,
$\Delta SOC_{Pi}$ is the SOC deviation of pack 'i'.
Step 2: Pack Type Identification & Active Cells in Pack 'i'
A pack is considered SOC surplus or SOC deficit based on the following conditions.
$\Delta SOC_{Pi}$ is positive—pack is SOC surplus.
$\Delta SOC_{Pi}$ is negative—pack is SOC deficit pack.
Active Cell Identification in Pack 'i'
Active cell are cells which require balancing.
1. Let, $SOC_{PiCj}$, denotes SOC of Cell 'j' in Pack 'i'.
Then, active cells are those cells which satisfy the following condition.

$$SOC_{PiCj} > \mu_B \text{ for SOC surplus pack}$$

$$SOC_{PiCj} < \mu_B \text{ for SOC deficit pack}$$

2. $N_{APi}$ denotes the number of Active cells in Pack 'i'.
Step 3: Balance SOC Calculation
Initially, the Balance SOC required for the whole pack is calculated. Based on that, Balance SOC for each Active and Non-Active cell is calculated.
Balance SOC Required in Pack 'i'

$$\Delta SOC_{BPi} = \Delta SOC_{Pi} * N_{Pi}$$

where,
$SOC_{BPi}$ is the Balance SOC required in pack 'i' to reach the Battery's SOC mean. A positive value denotes that the pack has to be charged and negative value denotes that the pack has to be discharged by the $SOC_{BPi}$ amount of SOC.
Step 4: Balance Time Calculation for Pack 'i'
Let $t_{bPi}$ denote the balance time for pack 'i'.
$I_b$ denotes the balancing current.

$$t_{bPi} = \frac{SOC_{APi}}{I_b} * \frac{N_T}{N_T - N_{APi}}$$

where, $$I_b = \begin{cases} i_d & \text{if } SOC \text{ surplus pack (to be discharged)} \\ i_c & \text{if } SOC \text{ deficit pack (to be charged)} \end{cases}$$

$i_d$ is the discharging current,
$i_c$ is the charging current.
Step 5: Prediction of SOC in Packs 'i+1' to 'n'
Add $SOC_{APi}$ to Active cell SOC.
Add $SOC_{\overline{A}}$ to Non-Active cell SOC.
Step 6: Active Cells and Balance Time Calculation for Pack 'i+1' to 'n'
Follow Step 1 to Step 5 for packs 'i+1' to 'n−1' sequentially. This is done only till 'n−1' and not 'n' because, the last pack in the Battery has no impact in Pack balancing.

Step 7: Balancing
Balance all the Active cells for the respective $t_{bPi}$ corresponding to each pack. Post Stage 1, all the packs will have equal SOC mean.
Stage 2: Cell Balancing
At this Stage, all the packs have approximately same mean SOC but are imbalanced within themselves. This stage ensures that Battery is balanced.
Step 1: SOC Information & Cell Type Identification
This step identifies the type of a cell, using which Active cells will be identified.
Calculate which is mean SOC of pack 'i'
Calculate SOC deviation for each cell 'j' in pack 'i'

$$\Delta SOC_{PiCj} = SOC_{PiCj} - \mu_{Pi}$$

where,
$SOC_{PiCj}$ is the SOC of the Cell 'j' in pack 'i'.
Cell Type Identification in Pack 'i'
A Cell is considered SOC surplus or SOC deficit based on the following conditions.
$\Delta SOC_{PiCj}$ is positive—Cell is SOC surplus
$\Delta SOC_{PiCj}$ is negative—Cell is SOC deficit
Step 2: Active Cell Identification in Pack 'i'
'$N_{APi}$' denotes the number of Active cells in pack $$N_{APi} = \min\{N_{SPi}, N_{DPi}\}$$

where,
$N_{SPi}$ is the number of SOC surplus cells in pack 'i'
$N_{DPi}$ is the number of SOC deficit cells in pack 'i'
Sort the SOC surplus cells in decreasing order of $|\Delta SOC_{PiCj}|$. Let this be denoted by the List '$L_s$'.
Sort the SOC deficit cells in decreasing order of $|\Delta SOC_{PiCj}|$. Let this be denoted by the List '$L_D$'.
Select $N_{APi}$ cells from '$L_s$' and '$L_D$'. These are the Active cells.
Step 3: Balance Time Calculation for Active Cell in Pack 'i'
For each Active cell 'j' in pack 'i', Balance time '$t_{bPiCj}$' can be calculated as $$t_{bPi} = \frac{\Delta SOC_{PiCj}}{I_b}$$

where,
Balancing Current $$I_b = \begin{cases} i_d & \text{if } SOC \text{ surplus pack (to be discharged)} \\ i_c & \text{if } SOC \text{ deficit pack (to be charged)} \end{cases}$$

$i_d$ is the discharging current,
$i_c$ is the charging current.
Step 4: Balance SOC and Balance Time Calculation for Cells in Pack 'i+1' to 'n'
Follow Step 1 to Step 4 for packs 'i+1' to 'n' sequentially.
Step 5: Balancing
Balance all the Active cells for the respective $t_{bPi}$ corresponding to each pack.
Post Stage 2, Battery will be balanced.

In an embodiment, the reactive charger transfer unit further comprises a pair of first and second resistance elements, wherein the first and second resistance elements are connected with the first and second switching elements respectively. Consequently, the first and second resistance elements are connected with the first and second sides of the transformer. Furthermore, the first and second resistance elements may be used to measure current in the first and second sides of the transformers. Specifically, the current in the first and second resistance elements may be measured to determine presence of current in a transformer. More specifically, the pair of first and second switching elements may turn of when current in the side associated therewith drops to zero.

In an embodiment, the battery balancing system comprises of an active cell balancing circuit, wherein the active cell balancing circuit comprises of a first battery pack balancing unit, at least one intermediary battery pack balancing unit and a third battery pack balancing unit. The first battery pack balancing unit, the at least one intermediary battery pack balancing unit and the third battery pack balancing unit are connected in a sequential manner such that, multiple battery pack balancing units can be introduced in between first and third battery pack balancing unit. Moreover, the first battery pack balancing unit, the at least one intermediary battery pack balancing unit and the third battery pack balancing unit can be an ASIC (Application Specific Integrated Chip) with plurality of input and output terminals. The output terminals of the ASIC can be a ground terminal or a negative voltage potential terminal or a controlled terminal to facilitate flow of current through the terminal and the input terminal of the ASIC can be a positive terminal or controlled terminal to facilitate flow of current through the terminal. Furthermore, the first, at least one intermediary and third battery pack balancing units are associated with a first, at least one intermediary and third battery packs respectively. Moreover, the first battery pack, at least one intermediary battery pack and third battery pack are connected in series, wherein multiple battery packs connected in series can be introduced in between the first battery pack and third battery. Furthermore, at least one of the input terminal of the first battery pack balancing unit is connected to a positive terminal of the first battery pack and the battery individually. Furthermore, the at least one of the output terminal of the first battery pack balancing unit is connected to the negative terminal of first battery pack and the positive terminal of the consecutive battery pack connected in series with first battery pack. Moreover, the at least one intermediary battery pack balancing unit is connected to the positive terminal of the at least one intermediary battery pack and the positive terminal of the battery. Furthermore, one of the output terminal of the at least one intermediary battery pack balancing unit is connected to the negative terminal of the at least one intermediary battery pack and the positive terminal of the consecutive battery pack connected in series with second battery pack. Moreover, at least one of the input terminal of the third control unit are connected to the positive terminal of the third battery pack and positive terminal of the battery individually. Furthermore, the at least one of the output terminal of the third battery balancing unit is connected to the negative terminal of the third battery pack and the negative terminal of the battery. Furthermore, the first, at least one intermediary and third battery balancing unit comprises of plurality of reactive charge transfer unit, wherein the plurality of reactive charge transfer units are connected to each of the plurality of cells, in the same manner as the second control unit is connected to the plurality of reactive charge transfer units. Moreover, the first, at least one intermediary and the third battery pack balancing unit functions as second control unit to balance the plurality of cells within a battery pack.

Furthermore, the first, at least one intermediary and the third battery pack balancing unit can be controlled by a microprocessor (not shown) or the first control unit to implement the two-stage battery balancing process. Furthermore, each of the first, at least one intermediary and the third the battery pack balancing units are communicably coupled with each other and the microprocessor to achieve the battery pack balancing in in a sequential manner such that the battery pack which is balanced, is eliminated from the subsequent iterative operations of the battery pack balancing process. Moreover, the first, at least one intermediary and the third battery pack balancing unit functions as second control unit to balance the plurality of cells within the battery pack.

In an embodiment, the system may further comprise a charger for providing electrical current to the plurality of cells in an event of discharging thereof. Optionally, supply of the electrical current may be monitored and regulated by the first control unit to provide distributed charge transfer across the plurality of cells.

DETAILED DESCRIPTION OF THE DRAWINGS

Figure 1:
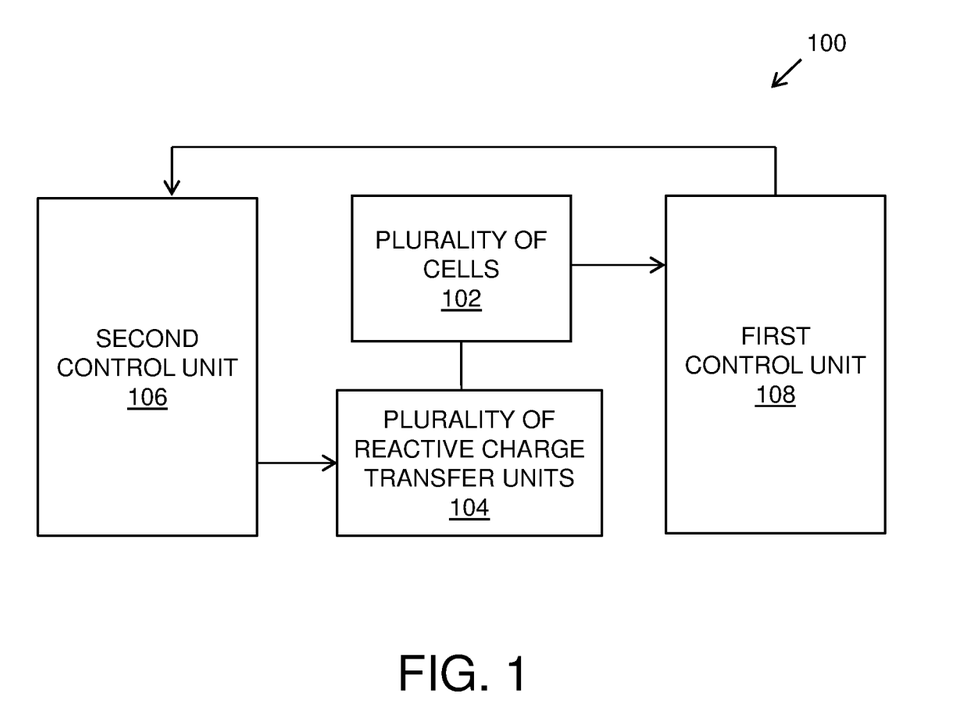
FIG. 1 is a schematic illustration of a block diagram of a system for balancing a battery having a plurality of cells connected in series, in accordance with an embodiment of the present disclosure.

Referring to FIG. 1, illustrated is a block diagram of a system 100 for balancing a battery having a plurality of cells 102 connected in series, in accordance with an embodiment of the present disclosure. As shown, the system 100 for balancing a battery having a plurality of cells 102 connected in series comprises a plurality of reactive charge transfer units 104 connected with the plurality of cells 102. The system further comprises a first control unit 106 and a second control unit 108. The first control unit 106 is configured to determine a state of charge of each of the plurality of cells 102, determine a reference value associated with the battery from the determined state of charge of each of the plurality of cells 102, identify an overcharged cell or a discharged cell in the battery, using the state of charge of each of the plurality of cells 102, or the reference value associated with the battery, and determine a charge differential between state of charge of the overcharged cell or the discharged cell and the reference value associated with the battery. Furthermore, the second control unit 108 is configured to arrange charge transfer between the overcharged cell or the discharged cell, and remaining pack of cells in the battery via the plurality of reactive charge transfer units 104.

Figure 2:
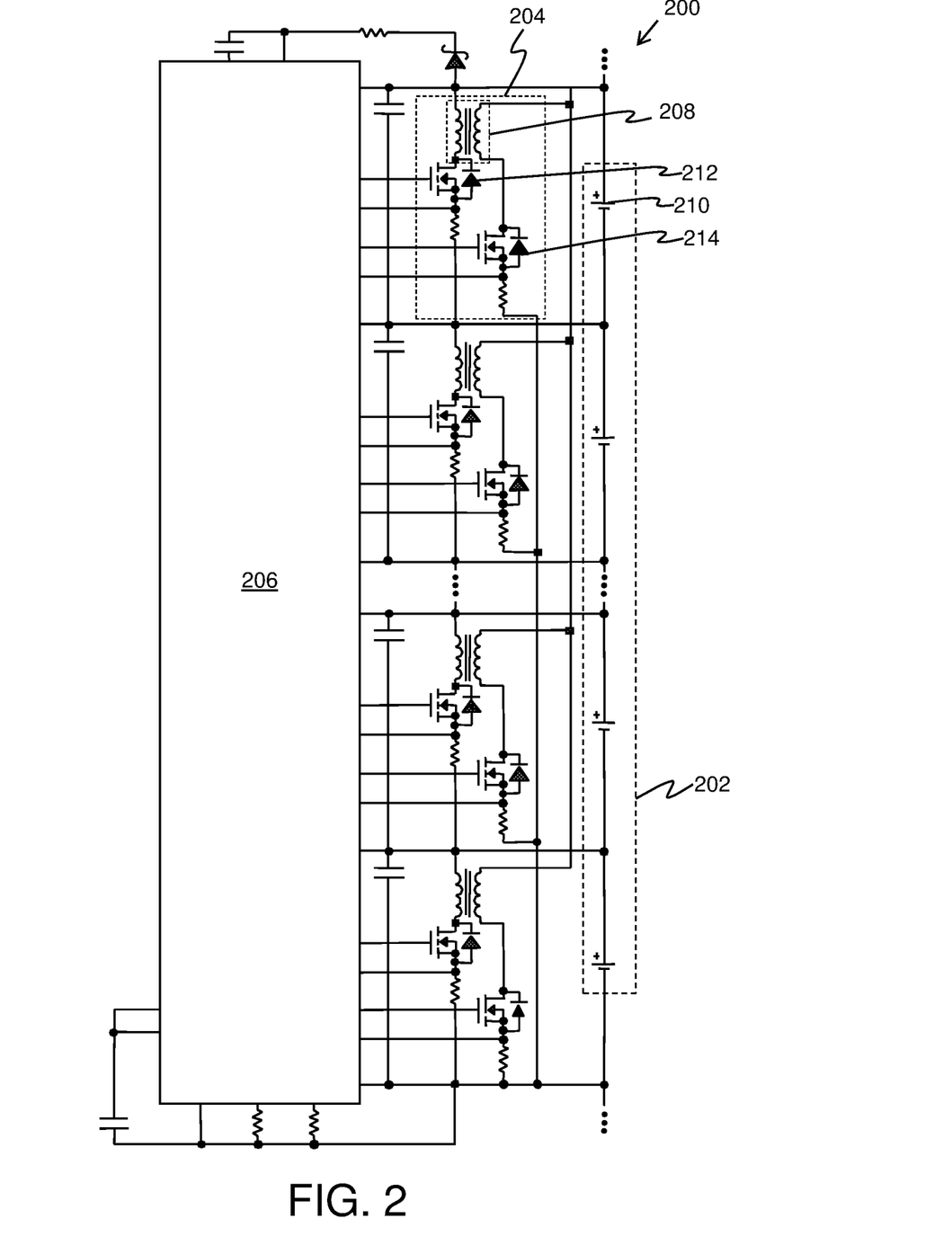
FIGS. 2-3 are exemplary implementation of the system for balancing a battery, in accordance with an embodiment of the present disclosure.

Referring to FIG. 2, illustrated is an exemplary implementation of the system for balancing a battery (such as the system 100 of FIG. 1), in accordance with an embodiment of the present disclosure. As shown, the system 200 comprises a plurality of cells 202 (such as the plurality of cells 102 of FIG. 1). The system 200 further comprise a plurality of reactive charge transfer units, such as a reactive charge transfer unit 204, and a second control unit 206 (such as the second control unit 108 of FIG. 1). Furthermore, each of the plurality of reactive charge transfer units, such as the reactive charge transfer unit 204 comprises a transformer, such as a transformer 208, wherein a respective transformer, such as the transformer 208, is associated with a respective cell, such as a respective cell 210. Additionally, the reactive charge transfer unit 204 further comprises a pair of first and second switching elements 212 and 214 respectively.

Figure 3:
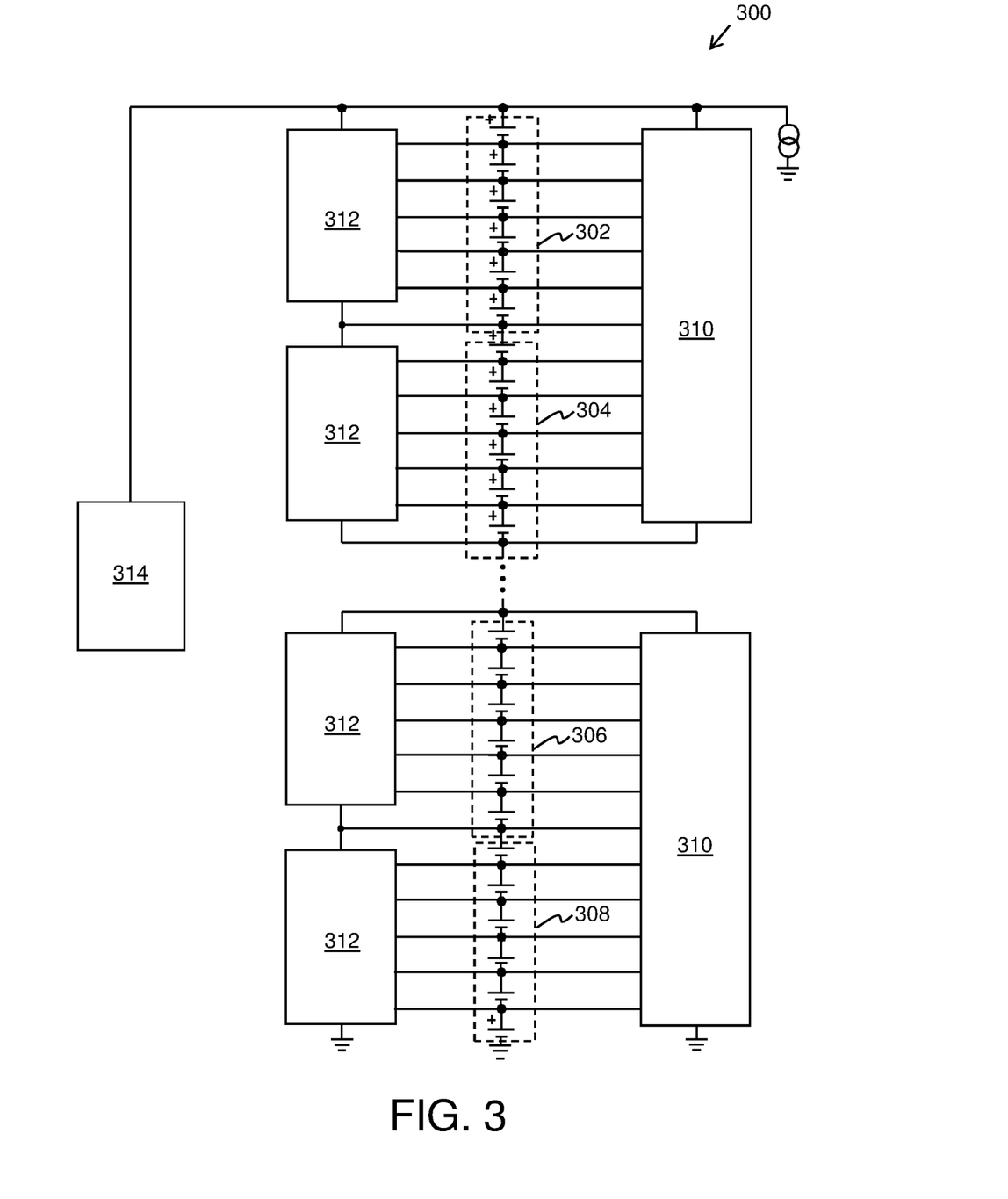

Referring to FIG. 3, illustrated is an exemplary implementation of the system for balancing a battery (such as the system 100 of FIG. 1), in accordance with an embodiment of the present disclosure. As shown, the system 300 comprises a plurality of cells, such as the cells 302, 304, 306 and 308. The system further comprises a first control unit 310 (such as the first control unit 106 of the FIG. 1) and a second control unit 312 (such as the second control unit 108 of FIG. 1). Moreover, the system 300 comprises a charger 314 for supplying electrical power to the plurality of cells for recharging. Furthermore, the plurality of cells are earthed for discharging in an event of overcharging of the plurality of cells.

It may be understood by a person skilled in the art that the FIGS. 2 and 3 include simplified arrangement for implementation of the system 100 for sake of clarity, which should not unduly limit the scope of the claims herein. The person skilled in the art will recognize many variations, alternatives, and modifications of embodiments of the present disclosure.

Figure 4:
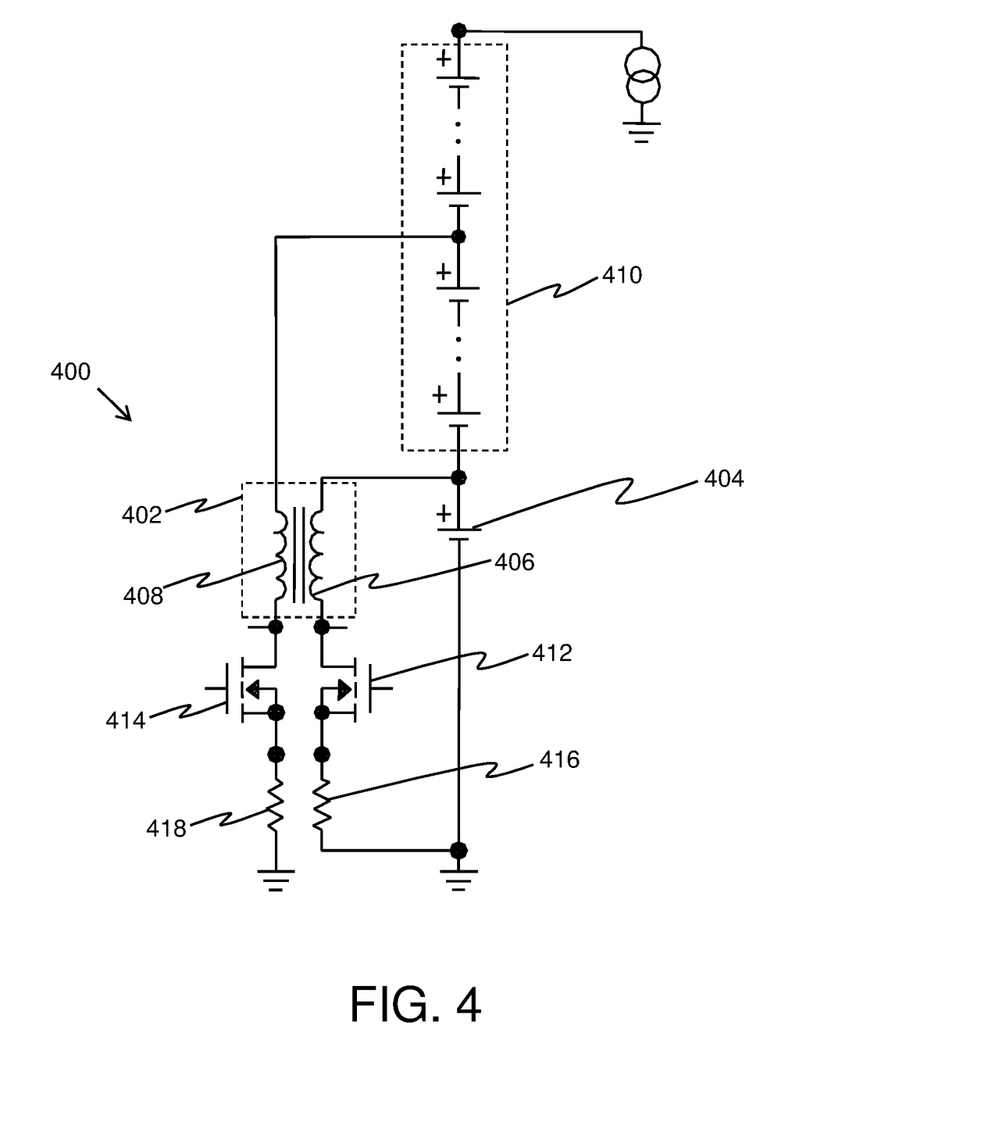
FIG. 4 is an illustration of a circuit architecture of a reactive charge transfer unit, in accordance with an embodiment of the present disclosure.

Referring to FIG. 4, illustrated is an illustration of a circuit architecture of a reactive charge transfer unit 400, in accordance with an embodiment of the present disclosure. As shown, the reactive charge transfer unit 400 comprises a transformer 402, wherein the transformer 402 is associated with the respective cell 404. Specifically, the transformer 402 comprises a first side 406 and a second side 408, wherein the first side 406 is connected with the respective cell 404 and the second side 408 is connected with the plurality of cells in the battery. In an implementation, charge transfer may be arranged via the reactive charge transfer unit 400 between the respective cell 404 and the remaining pack of cells 410. Additionally, the reactive charge transfer unit 400 further comprises a pair of first and second switching elements 412 and 414 respectively. Specifically, the pair of first and second switching elements 412 and 414, is associated with first side and second side 406 and 408, of the transformer 402, respectively. Furthermore, the reactive charge transfer unit 400 further comprises a pair of first and second resistance elements 416 and 418, wherein the pair of first and second resistance elements 416 and 418 is connected with the first and second switching elements 412 and 414, respectively.

Figure 5:
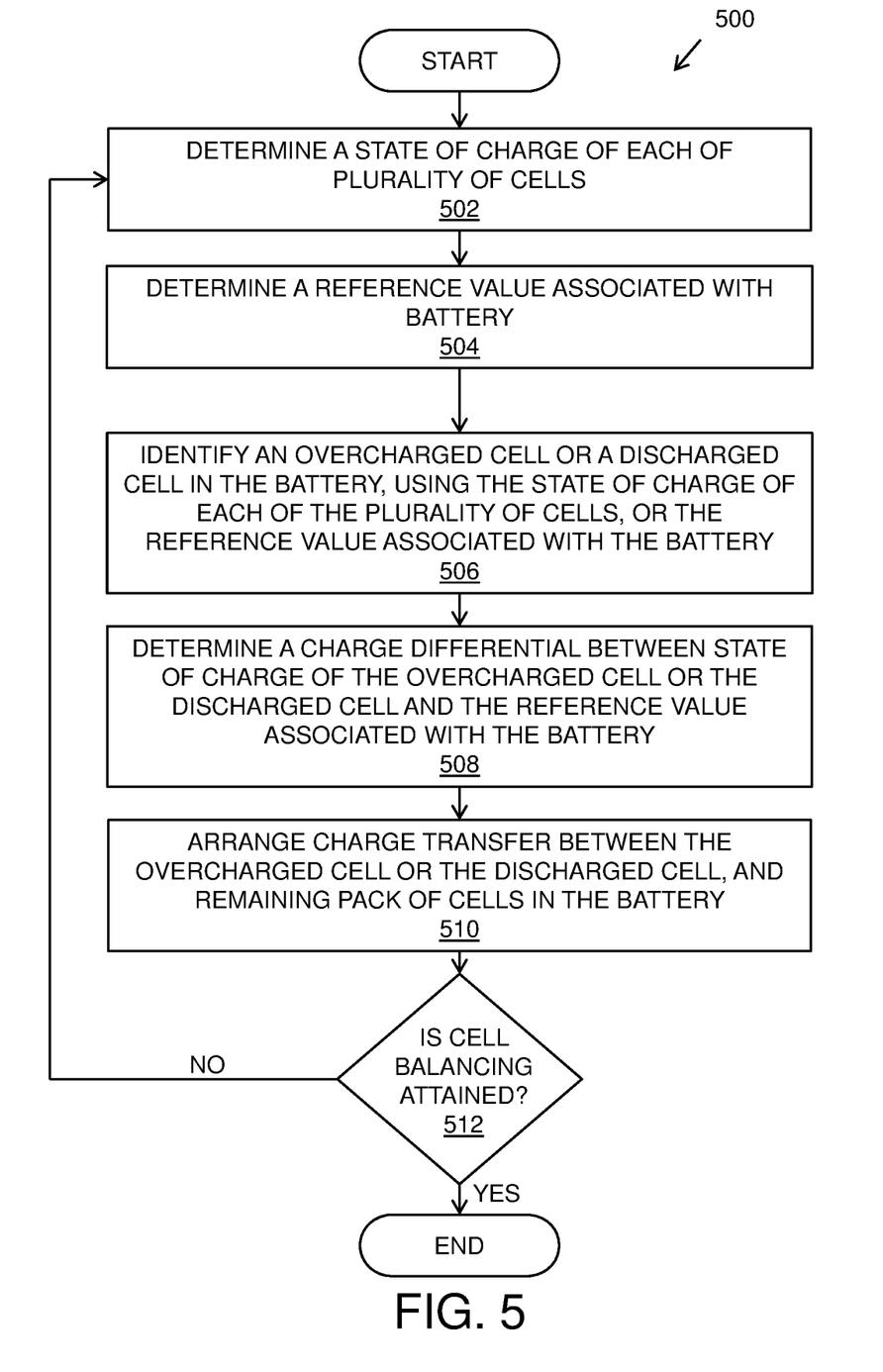
FIG. 5 is an illustration of steps of a method for balancing a battery having a plurality of cells connected in series, in accordance with an embodiment of the present disclosure.

Referring to FIG. 5, illustrated are steps of a method 500 for balancing a battery having a plurality of cells connected in series, in accordance with an embodiment of the present disclosure. At step 502, a state of charge of each of the plurality of cells is determined. At step 504, a reference value associated with the battery is determined from the determined state of charge of each of the plurality of cells. At step 506, an overcharged cell or a discharged cell in the battery is identified using the state of charge of each of the plurality of cells, or the reference value associated with the battery. At step 508, a charge differential between state of charge of the overcharged cell or the discharged cell and the reference value associated with the battery is determined. At step 510, charge transfer is arranged between the overcharged cell or the discharged cell, and remaining pack of cells in the battery. At step 512, determine whether cell balancing has been attained or not. If no, the steps 502 to 510 are iteratively performed until cell balancing is attained. If yes, the method ends.

The steps 502 to 512 are only illustrative and other alternatives can also be provided where one or more steps are added, one or more steps are removed, or one or more steps are provided in a different sequence without departing from the scope of the claims herein.

Figure 6:
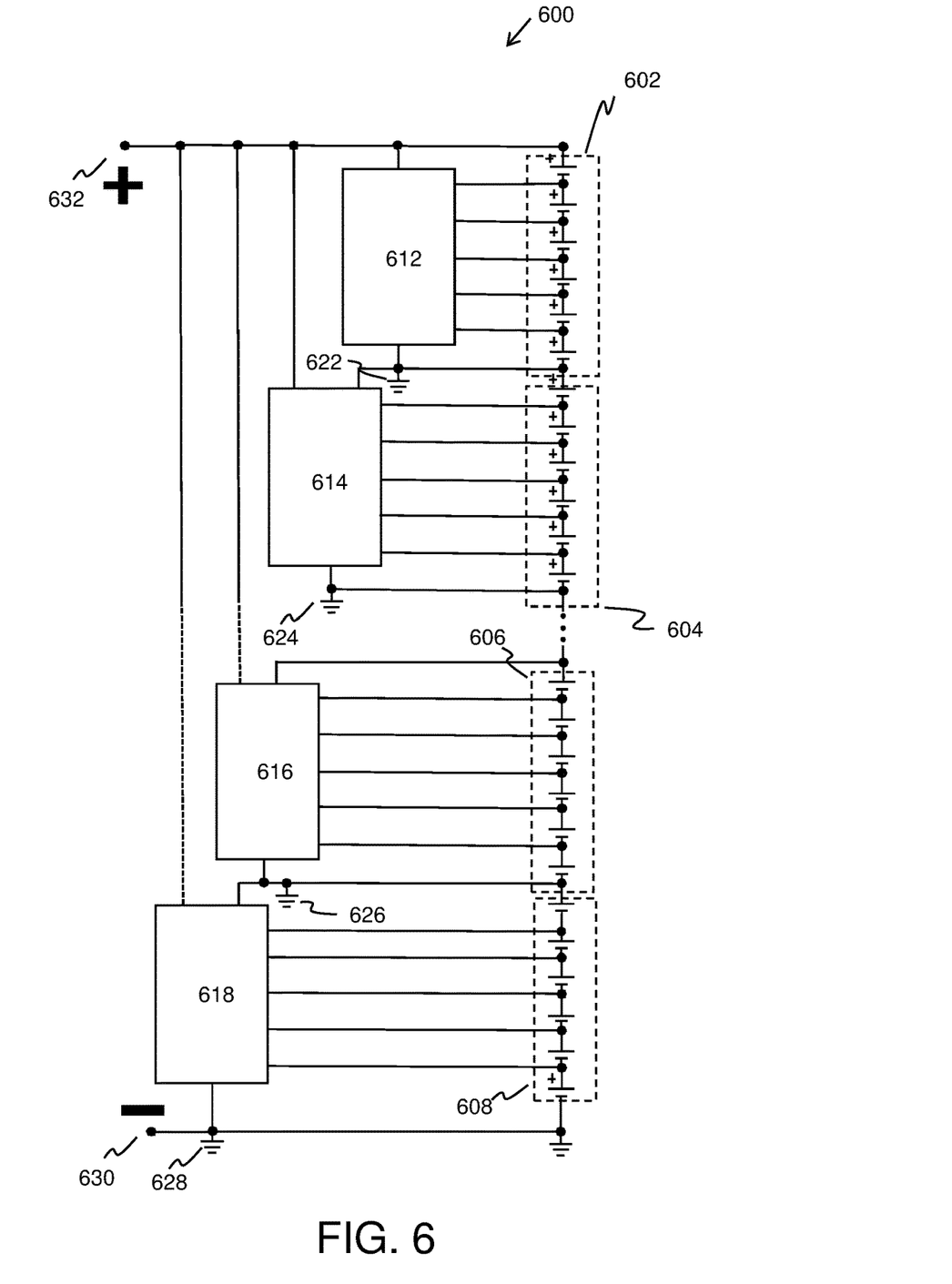
FIG. 6 is an exemplary implementation of the system for balancing a battery, in accordance with an embodiment of the present disclosure.

Referring to FIG. 6, illustrated is an exemplary implementation of the system for balancing a battery (such as the system 100 of FIG. 1), in accordance with an embodiment of the present disclosure. As shown, the system 600 comprises a plurality of battery packs 602, 604, 606 and 608. The system further comprises plurality of battery pack balancing unit 612, 614, 616 and 618. Moreover, the input terminal of the plurality of battery pack balancing units 612, 614, 616 and 618 is connected to a battery positive terminal 632 and at least one of the output terminals of the plurality of battery pack balancing units 612, 614, 616 and 618 are at different voltage potential with respect to the battery negative terminal 630. Moreover, the battery pack balancing unit 612 is represented as first battery pack balancing unit, the battery pack balancing unit 618 is the third battery pack balancing unit and the plurality of battery pack balancing units between 612 and 618, are the intermediary battery packs.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for balancing a battery having a plurality of cells connected in series, characterized in that the system comprising:
   (a) a plurality of reactive charge transfer units connected with the plurality of cells;
   (b) a first control unit configured to:
      (i) determine a state of charge of each of the plurality of cells;
      (ii) determine a reference value associated with the battery;
      (iii) identify a state of charge of an overcharged cell or a discharged cell in the battery, using the state of charge of each of the plurality of cells, or the reference value associated with the battery; and
      (iv) determine a charge differential between the state of charge of the overcharged cell or the discharged cell and the reference value associated with the battery; and
   (c) a second control unit configured to arrange a charge transfer between the overcharged cell or the discharged cell, and a remaining pack of cells in the battery via the plurality of reactive charge transfer units;
   wherein the first control unit and the second control unit are configured to function iteratively until cell balancing is attained, and wherein the second control unit is configured to arrange the charge transfer by:
      (i) dividing the charge differential based on a number of cells in the remaining pack of cells; and
      (ii) arranging parallel transfer of the divided charge differential between the overcharged cell or the discharged cell and each cells in the remaining pack of cells in the battery via the plurality of reactive charge transfer units.

2. The system of claim 1, wherein the first control unit is configured to control the second control unit.

3. The system of claim 1, wherein the reference value associated with the battery is a mean state of charge of the battery.

4. The system of claim 1, wherein each of the plurality of reactive charge transfer units comprises a transformer, wherein a respective transformer is associated with a respective cell of the plurality of cells.

5. The system of claim 4, wherein the transformer comprises a first side and a second side, wherein the first side of the transformer is connected with the respective cells and the second sides of the plurality of transformers is connected with the plurality of cells in the battery.

6. The system of claim 4, wherein a reactive charge transfer unit of the plurality of reactive charge transfer units further comprises a pair of first and second switching elements configured to control the charge transfer between the overcharged cell or the discharged cell and the remaining pack of cells in the battery.

7. The system of claim 6, wherein the reactive charge transfer unit further comprises a pair of first and second resistance elements, wherein the pair of first and second resistance elements is connected with the first and second switching elements respectively.

8. The system of claim 4, wherein the pair of first and second switching elements is associated with the first side and the second side of the transformer, respectively.

9. A method for balancing a battery having a plurality of cells connected in series, the method comprising:
(a) determining a state of charge of each of the plurality of cells;
(b) determining a reference value associated with the battery;
(c) identifying a state of charge of an overcharged cell or a discharged cell in the battery, using the state of charge of each of the plurality of cells, or the reference value associated with the battery;
(d) determining a charge differential between the state of charge of the overcharged cell or the discharged cell and the reference value associated with the battery;
(e) arranging a charge transfer between the overcharged cell or the discharged cell, and a remaining pack of cells in the battery; and
(f) iteratively performing steps (a) to (e) until cell balancing is attained,
wherein arranging the charge transfer between the overcharged cell or the discharged cell and the remaining pack of cells in the battery comprises:
(i) dividing the charge differential based on number of cells in the remaining pack of cells, and
(ii) arranging parallel transfer of the divided charge differential between the overcharged cell or the discharged cell and each of the cells in the remaining pack of cells in the battery.

10. The method of claim 9, wherein identifying the overcharged cell or the discharged cell in the battery comprises comparing the state of charge of the overcharged cell and the discharged cell with the state of charge of each of the plurality of cells.

11. The method of claim 9, wherein identifying the overcharged cell or the discharged cell in the battery comprises comparing the state of charge of the overcharged cell or the discharged cell with the reference value associated with the battery.

12. The method of claim 11, wherein the overcharged cell in the battery is a cell having a maximum state of charge and the discharged cell in the battery is a cell having a minimum state of charge.

13. The method according to claim 9, wherein the reference value associated with the battery is a mean state of charge of the battery.

* * * * *